3,256,311
PRODUCTION OF NITRILES FROM N-FORMYLATED PRIMARY AMINO COMPOUNDS IN CONTACT WITH A CATALYST
Friedrich Becke, Heidelberg, and Otto Paul Swoboda, Mannheim, Germany, assignors to Badische Anilin- & Soda-Fabrik Aktiengesellschaft, Ludwigshafen (Rhine), Germany
No Drawing. Filed July 18, 1962, Ser. No. 210,827
Claims priority, application Germany, Feb. 26, 1959, B 52,259; Jan. 8, 1960, B 56,168
8 Claims. (Cl. 260—464)

This application is a continuation-in-part of our co-pending application Serial No. 10,020, filed February 23, 1960, now abandoned.

This invention relates to a process for the catalytic production of nitriles from N-formylamino compounds. More specifically, the invention relates to a process for the production of nitriles from N-formylamino compounds with the use of new catalysts.

It is known that nitriles are obtained by leading the vapors of primary amine formates at elevated temperature over highly porous catalysts, such as silica gel, activated carbon or alumina (German patent specification No. 482,943). The reaction proceeds by way of the N-formyl compound as an intermediate product; however, it is not the expected isonitrile which is formed but, by reason of a rearrangement, a nitrile which contains one carbon atom more than the amine used. The yields and especially the conversion rates in this process are unsatisfactory. A further disadvantage consists in the fact that the catalysts are not suitable for continuous operation. Their activity is completely lost even after a few hours.

Higher yields and conversion rates and longer operational periods are achieved by the process in accordance with U.S. patent specification No. 2,904,579. A characteristic feature of this process is that inert gas is co-employed or the reaction is carried out under vacuum. The method is recommended for the reaction of formylated aromatic amines.

It is an object of the present invention to provide a process by which nitriles are obtained in high yields from N-formylamino compounds. It is another object of the invention to provide a process by which N-formylamino compounds are converted into nitriles with high conversion rates. It is still another object of the invention to provide a process for the conversion of N-formylamino compounds into nitriles which can be operated continuously for prolonged periods owing to the use of suitable catalysts. It is a further object of this invention to provide a process in which high yields, high conversion rates and long operational periods are achieved without co-employment of an inert gas and when working under atmospheric or slightly elevated pressure. It is still a further object of this invention to provide a process by which not only aromatic, but also aliphatic, cycloaliphatic and arylaliphatic formylated amines may be reacted, high yields and conversion rates being obtained. Other objects of the invention will become apparent from the following description.

According to this invention, the said objects are achieved by reacting an N-formylamino compound at elevated temperature in the gaseous phase in the presence of active silicic acid gels (so-called silica gels) or silicates having more than 50% of pores of a radius of 10 to 200 A., the mean pore radius ranging between 20 and 100 A., and an internal surface of less than 550 square meters per gram. The preferred catalysts are those which have more than 75% of pores of a radius of 12 to 100 A., a mean pore radius of 12 to 60 A. and an internal surface of less than 500 square meters per gram.

The initial materials are derived from aliphatic, cycloaliphatic, araliphatic and mono- or polynuclear aromatic primary amines. The amines may be monoamino compounds but may also contain more than one amino group, for example two or three amino groups. The initial materials may be free from reactive groups other than the formylated amino groups but may also bear atoms or groups which are inert under the conditions of the process, such as 1 or 2 halogen atoms, nitrile groups or alkoxy groups with 1 to 4 carbon atoms. Suitable initial materials may be derived, for example, from methylamine, ethylamine, $\beta$-methoxyethylamine, $\beta$-ethoxyethylamine, butylamine, isobutylamine, $\beta$-fluoroethylamine, $\epsilon$-chlor-n-hexylamine, $\omega$-amino-oenanthic nitrile, laurylamine, stearylamine, tetramethylene diamine, pentamethylene diamine, 2-methyl-pentamethylene diamine, hexamethylene diamine, 2-ethylhexamethylene diamine, heptamethylene diamine, octamethylene diamine, dodecamethylene diamine, cyclohexylamine, cyclo-octylamine, cyclododecylamine, 2-methylcyclohexylamine, 4-methoxycyclohexylamine, benzylamine, $\beta$-phenylethylamine, $\beta$-p-chlorophenylethylamine, $\beta$-p-isopropylphenylethylamine, hexahydrobenzylamine, aniline, o-, m- and p-toluidine, anisidine, o-, m-and p-chloroaniline, o,p-dichloroaniline, o-, m- and p-phenylene diamine, p-aminobenzonitrile, and $\alpha$- and $\beta$-naphthylamine. The N-formyl compounds are obtained from the amines in conventional manner, for example by heating the formates.

The aforementioned N-formylated primary amines fall within one of the classes of an N-formylated alkyl primary amine, an N,N'-diformylated alkylene di-primary diamine, and N-formylated cycloalkyl primary amine, an N-formylated aryl hydrocarbon primary amine, an N-formylated arakyl primary amine and the aforesaid N-formylated primary amines substituted on carbon atoms with 1–2 members from the group consisting of 1–2 halogen atoms, alkoxy of 1–4 carbons and nitrile said N-formylated primary amine being free from reactive groups other than said N-formylated amine groups.

Suitable silicic acid gel catalysts are advantageously obtained by precipitation of silicic acid sols or silicate solutions by heating or by the addition of acids, by treatment of the gels with electrolytes and then drying. Silica gels which are useful for the purposes of our invention are obtained, for example, by the methods decribed in German patent specifications Nos. 444,914; 523,585; 527,370; 530,730, and 536,546.

The said catalysts which have relatively large pores combined with a small surface are especially obtained if, either before or during drying, the gels are treated with relatively strong alkaline agents. In this case the catalysts have an exchange acidity above pH 3. The best results are obtained with catalysts having exchange acidities of between pH 3 and pH 7. Catalysts having exchange acidities below pH 3 are rather small-pored and less useful. The term "exchange acidity" is meant to denote the pH-value set up by stirring 1 gram of the gel with 10 grams of an N/10 solution of potassium chloride for some time.

The pore radius distribution can be determined by the method described in J. Am. Chem. Soc. 73 (1952), p. 373. The determination by this method is based on the measuring of the adsorption and desorption speed of nitrogen. A method for determining the internal surface of porous materials is described in J. Am. Chem. Soc. 60 (1938), p. 309. Finally, the mean pore radius can be calculated from the internal surface and the overall pore volume by the method described in French patent specification No. 1,181,210.

An earlier method for determining the pore radius distribution originates from Kubelka ("Kolloid-Zeitschrift" 55 (1931), p. 129). This method allows for determining the portion of the pores having a diameter of from 2 to 43 m$\mu$. This method, like the one described in J. Am. Chem. Soc. 73 (1951), p. 373, is suitable for the characterization of the catalyst, although less accurate than the latter. Thus a silica gel which by the more recent method was found to contain 90% of pores of a radius of from 10 to 200 A., was found to contain from 75 to 90% of pores with a diameter of from 2 to 43 m$\mu$ when applying the earlier method.

It has been found that not only silicic acid gel but also silicates are highly effective catalysts provided they meet the requirements as regards pore radius distribution, mean pore radius and internal surface set forth above. Apparently, it is not important whether silicic acid is present in the form of silicic acid gel or combined with basic oxides, such as magnesium oxide, calcium oxide, aluminum oxide and iron oxide, to form silicates, as long as silicic acid gel and silicates exhibit the said physical properties. Suitable catalysts are, for example, natural or synthetic silicates containing essentially magnesium oxide, iron oxide and/or aluminum oxide as basic oxides (up to 40% by weight) and being known as bleaching earths. Such natural silicates are montmorillonite, tonsile, bentonite, and fuller's earth. Synthetic silicates of this type are prepared by joint precipitation of suitable salt solutions.

Catalysts with especially long life and giving especially high conversion rates are those which additionally contain a metal oxide, especially an oxide of a metal of groups IIIA, IVB, VB and VIB of the periodic system. A further effect of the addition of an oxide consists in the fact that in the reaction of N,N'-diformyldiamino compounds the relative proportions of the two possible reaction products, namely dinitrile and aminonitrile, can be varied and this is often desirable. A specially effective metal oxide is titanium oxide. Examples of other suitable metal oxides are aluminum oxide, zirconium dioxide, thorium dioxide, vanadium oxide, chromium oxide, molybdenum oxide and tungsten oxide. The proportion of the metal oxides lies as a rule between 0.1 and 10% by weight with reference to the catalyst.

The catalysts activated by metal oxides can be produced, for example, by joint precipitation or by subsequent application of the metal oxides to the catalysts, for example by soaking silica gel or silicates with solutions of metal salts decomposable by heating, drying the same and heating in a current of gas.

One embodiment of the invention, given by way of example, consists in allowing the initial material to flow to a packed vaporization zone located in a vertical reaction tube, and leading the vapors over the catalyst heated to the reaction temperature, i.e., 400° to 600° C., advantageously 460° to 560° C. It is good practice to supply, together with the initial material, a gas, such as nitrogen, carbon monoxide, ammonia, or any mixture of these gases in an amount which is about 0.5 to 20 moles with reference to the N-formylamine. The use of ammonia as inert gas is especially to be recommended when formylated diamines are reacted which tend to form polymethylene imines. Such a compound is, for example, N,N'-diformylhexamethylene diamine.

Generally, the time of contact with the catalyst is 0.5 to 10 seconds, advantageously 1.5 to 3 seconds and the space velocity is about 25 to 35 kilograms of N-formylamine per liter of catalyst per day. The reaction is advantageously carried out at atmospheric pressure, but reduced or increased pressures can also be used, for example, pressures between 20 mm. Hg and 5 atmospheres.

The reaction product is condensed upon leaving the reaction tube and can be fractionally distilled. In many cases it is good practice to neutralize the amines contained in the reaction mixture with formic acid prior to distillation. A slight excess of the acid, for example 5 to 10 mole percent, is recommendable. The amine remains behind as the formate or as the formyl compound and can be used again for further reactions according to the invention, either purified or unpurified.

Another method of processing the reaction mixture consists in saponifying the nitrile formed and separating the resultant carboxylic acid, by way of its alkali salt, from the other organic components of the reaction mixture.

The production of the initial material may be combined with the reaction according to this invention, by first leading the amine and formic acid, if desired in aqueous form, or an ester of formic acid, in particular a formic acid ester of an alkanol with 1 to 4 carbon atoms, through a zone of elevated temperature and leading the N-formylamino compound formed into the catalyst zone, the amine and formic acid or the formic acid ester being employed in stoichiometric quantities or in excess.

The activity of the catalysts remains unchanged over a long period of operation. In general at least 1,000, but frequently 3,000 to 4,000 parts by weight of N-formylamino compound can be reacted per part by weight of the catalyst before the activity markedly subsides. The catalyst can then be regenerated by treating it with oxygen or an oxygen-containing gas at 450° to 700° C. It is advantageous, after four of five regenerations, to add a treatment with a dilute solution, especially an aqueous solution, of a volatile acid at room temperature or moderately elevated temperature, as for example 30° to 50° C. In this way the exchange acidity of the catalyst is again shifted into the optimum range. Suitable acids are for example formic acid, acetic acid and especially dilute hydrochloric acid, e.g., 2 to 20% aqueous hydrochloric acid.

The nitriles obtainable according to this invention are valuable intermediate products, for example for the production of plastics, plasticizers and pesticides.

The following examples will further illustrate this invention but the invention is not restricted to these examples.

*Example 1*

For the preparation of the catalyst, 200 g. of silica gel (90% of the pores with a radius between 10 and 200 A.; mean pore radius 48.9 A.; internal surface 314 m.$^2$/g.) the exchange acidity of which lies at pH 5 to 6.6, is mixed with a solution of 5 g. of titanium tetrachloride in 100 g. of absolute alcohol. The mixture is allowed to stand in the air for one quarter of an hour and then 40 g. of water is added. The catalyst is heated for 10 hours at 300° C. in a current of ammonia prior to use.

An upright quartz tube which is 100 centimeters in length and 5 centimeters in width is filled in the lower and upper thirds with quartz rings and in the middle third with the catalyst. The tube is heated externally so that the temperature in the catalyst zone is 510° to 540° C. and in the upper third 450° to 500° C. 250 liters of nitrogen per hour is led through the tube downwardly, and 800 g. of formanilide is allowed to flow into the upper part of the tube.

The cooled liquid mixture leaving the tube, after the addition of 15 g. of sodium chloride per hour, quickly separates into an organic phase consisting of benzonitrile and aniline and an aqueous phase which contains only traces of aniline and benzonitrile and can therefore be discarded. For working up, the organic phase is mixed with a small excess of formic acid (about 5 mole percent with reference to the aniline determined in the reaction mixture by titration) and then fractionally distilled. Water and excess formic acid are first driven off at normal pressure and then benzonitrile is obtained with a boiling point of 84° C. at 20 mm. Hg. The formanilide remaining in the distillation flask can be returned to the process without purification.

The amount of formanilide converted in the said manner with 320 g. of catalyst in five weeks is 670,000 g., i.e., 2,100 g. per gram of catalyst; the catalyst still has its original activity. Benzonitrile is obtained in a yield of 83.5% of the theory with reference to the formanilide used and of 99.76% of the theory with reference to the formanilide reacted.

When proceeding as above described but using as catalyst a commercial silica gel with about 90% of pores with a radius below 25 A., the means pore radius being 11.07 A., and an internal surface of 751 m.²/g., i.e., a silica gel which does not satisfy the requirements of a catalyst according to the present invention, the following results are obtained:

During the first hour, 61.4% of the formanilide used is converted into benzonitrile, 25.6% is split into aniline and carbon monoxide and 4.2% is recovered unchanged as formanilide. After only 50 hours of operation, the activity of the catalyst has fallen off considerably; only 10.1% of the formanilide is then being converted into benzonitrile, 4.6% is recovered as aniline and 85.1% as formanilide. The catalyst can no longer be regenerated by treating it with air at 600° C.

Example 2

The apparatus and the catalyst used are as in Example 1 except that the catalyst charge is only 140 cc. 175 g. of N-formyl-p-toluidine and 53 liters of nitrogen are led per hour over the catalyst at 510° to 540° C. The reaction mixture is worked up as described in Example 1, p-tolunitrile being obtained in an amount of 84.9% of the theory with reference to the initial material used. This is a yield of 99.1% of the theory with reference to N-formyl-p-toluidine reacted. From N-formyl-toluidine o-toluidine is obtained in an analogous way in a yield of 99.0% of the theory with a conversion rate of 87.2% of the theory.

Example 3

The apparatus and the catalyst charge are the same as in Example 2 and o-chloroformanilide is introduced as initial material. The entire reaction product is saponified by boiling for three hours with 5 N caustic soda solution under reflux. The o-chloroaniline is stripped in a separating funnel and the o-chlorobenzoic acid is precipitated by the addition of hydrochloric acid. o-Chlorobenzoic acid of the melting point 141° C. is obtained in a yield of 97% of the theory with reference to reacted o-chloroformanilide. 48% of the initial material is recovered as o-chloroaniline.

Example 4

The procedure of Example 2 is followed but using N-formayl-α-naphthylamine as initial material. A reaction product is obtained from which, by distillation after adding formic acid, 75.3% of the theory, with reference to the initial material used, of α-naphthonitrile of the boiling point 170° to 171° C. at 20 mm. Hg. is obtained. The product solidifies and has a melting point of 37° C. 23.2% of the initial material is recovered. The yield of α-napthonitrile, with reference to initial material reacted is 98.1% of the theory.

Example 5

The procedure of Example 2 is followed, N-formyl-cyclohexylamine being used as initial material. The reaction mixture rapidly separates into an organic phase consisting to the extent of about 90% of hexahydrobenzonitrile and an aqueous phase containing cyclohexylamine. The two phases are distilled, advantageously each separately, after the addition of formic acid in a small excess. From the organic phase there is obtained hexahydrobenzonitrile of the boiling point 79° to 80° C. at 20 mm. Hg. in a yield of 78% of the theory with reference to N-formyl-cyclohexylamine used. There are recovered 5.5% of N-formyl-cyclohexylamine from the organic phase and another 12.5% from the aqueous phase. The yield of nitrile, with reference to N-formyl-cyclohexylamine reacted, is 95.1% of the theory.

Example 6

N-formyl-benzylamine is reacted in the way described in Example 2. By distilling the organic phase there is obtained benzyl cyanide of the boiling point 118° to 120° C. at 20 mm. Hg in a yield of 87.3% of the theory with reference to the N-formyl-benzylamine used. 5.4% of the initial material is recovered from the aqueous phase. The yield of benzyl cyanide, with reference to N-formyl-benzylamine reacted, is 92% of the theory.

Example 7

100 g. of N-methylformamide and 53 l. of nitrogen are led per hour at 500° to 530° C. over the catalyst described in Example 2. The reaction material obtained in the separator and consisting of two phases is worked up as described in Example 4. 81% of the theory, with reference to the initial material used, of acetonitrile is obtained in the form of its azeotropic mixture with water, 17% of unreacted N-methylformamide being recovered. The yield of acetonitrile, with reference to methylformamide reacted, is 97.5% of the theory.

Example 8

36 l. of ammonia and 100 g. of N,N'-diformylhexamethylene diamine per hour are led over a catalyst of the type described in Example 1 at 470° to 500° C. in an apparatus of the type described in Example 2. At intervals of 250 hours, the catalyst is reactivated by leading air through the reaction tube at 450° to 700° C. By this regeneration the catalyst is restored to its original activity even when the regeneration has been repeated many times. Within 7 weeks there is converted in this way 117,600 g. of diformyl-hexamethylene diamine, i.e., 1,680 g. per g. of catalyst. Suberic acid dinitrile is obtained in a yield of 55 to 65% and amino-oenanthonitrile in a yield of 15 to 30% of the theory, depending on whether the determination is carried out shortly before or shortly after a regeneration period.

Example 9

In the manner described in Example 8, 53 l. of ammonia and 175 g. of N,N'-diformylhexamethylene diamine are led per hour over the catalyst described in Example 1. After 70 kg. of the formyl compound has been put through, i.e., after every 400 hours, the catalyst is reactivated with air. In addition, the catalyst is treated with dilute hydrochloric acid at room temperature after a period of 1,200 hours. In this manner 300,000 g. of diformylhexamethylene diamine is reacted using 70 g. of the catalyst in 72 days, 72% of suberic acid and 17% of amino-oenanthonitrile being obtained. The percentages are with reference to the theoretical amount. After the said 72 days, the catalyst still exhibits its full activity.

Example 10

2,500 g. of N,N'-diformyl-octamethylene diamine is led during the course of 25 hours over the catalyst described in Example 1 under the conditions described in Example 8. After the usual working up there are obtained 396 g. (20.6% of the theory) of ω-amino-pelargononitrile and 1,270 g. (62.0% of the theory) of sebacic acid dinitrile.

Example 11

The procedure of Example 2 is followed, ω-formamino-oenanthonitrile being used as initial material. The reaction product is worked up by fractional distillation under reduced pressure. Taking into account the initial material recovered, suberic acid dinitrile of the boiling point 160° C. at 5 mm. Hg is obtained in a yield of 89% of the theory; the conversion rate is 84.5%.

Example 12

Using the same apparatus and catalyst and working under the same conditions as in Example 1, 535 g. of aniline, 290 g. of 91% aqueous formic acid and 120 l. of nitrogen per hour are fed to the vaporization zone provided above the catalyst and the vapors are passed over the catalyst. The reaction mixture is worked up as described in Example 1. 77% of the aniline used is converted into benzonitrile and 22% is obtained as formanilide which can be reacted afresh. The yield of nitrile is 98.6% of the theory with reference to the aniline reacted.

By reacting 561 g. of o-toluidine and 264 g. of 91% aqueous formic acid, o-tolunitrile is obtained in a yield of 99% of the theory with a conversion rate of 75%.

Example 13

In the manner described in Example 2, 124 g. of aniline and 76 g. of formic acid of 81% strength are reacted per hour in the absence of nitrogen. In this manner 24 kg. of aniline and 14.7 kg. of formic acid of 81% strength can be passed over 140 cc. of catalyst in 8 days without the catalyst activity decreasing. Benzonitrile is obtained in a yield of 39% of the theory, referred to the aniline used, and of 99% of the theory, referred to the aniline reacted.

Example 14

The procedure being as in Example 2 with the exception that no carrier gas is used, 225 g. per hour of formanilide is led over the catalyst. Working up of the reaction product gives benzonitrile with a conversion rate of 80% of the theoretical amount. Referred to the unreacted formanilide the yield is 99% of the theory.

Example 15

Using an apparatus as described in Example 1, 175 g. of formanilide is led per hour, together with 53 l. of nitrogen, over 140 cc. of a silica gel catalyst which contains about 90% of pores with a radius from 10 to 200 A., the mean pore radius being 48.8 A., and has an internal surface of 314.0 m.$^2$/g., at a temperature of from 510° to 540° C. From the reaction product there are obtained 59% of the theoretical amount of benzonitrile and 40% of the theoretical amount of unreacted formanilide. Referred to formanilide reacted, the yield of nitrile is 98.3% of the theory.

By contrast, the same catalyst, after having been impregnated with 1% of titanium dioxide (cf. Example 1), gives benzonitrile with a conversion rate of 83.5% and in a yield of 99.6%.

Example 16

The procedure is as described in Example 15. The catalyst used is silica gel with a mean pore radius of 29.45 A. and an internal surface of 398.8 m.$^2$/g., 90% of the pore radii being within the range of from 12 to 100 A. Benzonitrile is obtained with a conversion rate of 36.0% and in an overall yield of 92.5% referred to the initial material reacted.

When impregnating the silica gel with 1% of titanium dioxide as described in Example 1, but using otherwise the same reaction conditions as above, benzonitrile is obtained in a yield of 65% of the theoretical amount, based on formanilide used, and of more than 99% of the theoretical amount, based on formanilide reacted.

Example 17

Into an apparatus of the type described in Example 1 which is charged with 180 cc. of silica gel of the type described in Example 15, 120 g. of N,N'-diformylhexamethylene diamine and 36 l. of ammonia are introduced in the course of one hour, the catalyst being kept at a temperature of 470 to 485° C. The reaction product is split up into its components by fractional distillation under reduced pressure. In 25 hours there are thus obtained from 3,000 g. of N,N'-diformylhexamethylene diamine, corresponding to 2,020 g. of hexamethylene imine, in addition to 550 g. of a forerun mainly consisting of hexamethylene diamine and water, 180 g. (8.9% of the theory) of hexamethylene diamine, 902 g. (41.0% of the theory) of ω-amino-oenanthonitrile of the boiling point 118° C. (8 mm. Hg), and 645 g. (27.1% of the theory) of suberic acid dinitrile of the boiling point 160° C. at 5 mm. Hg.

With an addition of 1% of titanium dioxide, the same catalyst yields 72% of the theoretical amount of suberic acid dinitrile and 17% of the theoretical amount of aminooenanthonitrile.

If, by comparison, a silica gel is used in which 70% of the active pore volume consists of pores with a diameter up to 20 A. and the exchange acidity lies at pH 2 to 3, there are obtained under otherwise identical conditions only 81 parts (11% of the theory) of ω-aminooenanthonitrile and 105 parts (13.3% of the theory) of suberic acid dinitrile.

When aluminum oxide is used as catalyst instead of silica gel, only 6.8% of the theory of ω-amino-oenanthonitrile and 1.8% of the theory of suberic acid dinitrile are obtained.

Example 18

Using the apparatus and catalyst and working under otherwise the same conditions as in Example 17, N,N'-diformylhexamethylene diamine is passed over the catalyst together with nitrogen instead of ammonia. In 25 hours there are obtained 40.0 g. (2% of the theory) of hexamethylene diamine, 934 g. (42.5% of the theory) of ω-amino-oenanthonitrile and 620 g. (26.2% of the theory) of suberic acid dinitrile.

Example 19

Analogously to the method described in Example 1, 800 g. per hour of formanilide is reacted in the presence of a catalyst consisting of silica gel containing 1% aluminum oxide.

The catalyst is prepared by soaking 200 g. silica gel (90% of the pores between 10 and 200 A., mean pore radius 48.9 A., internal surface 314 m.$^2$/g.) with a solution of 5.3 g. aluminum chloride in 50 ml. carbon disulfide, drying, hydrolyzing and again drying at 300° C. In addition to 138 g. unreacted formanilide there is obtained 557 g. benzonitrile, i.e., 82% of the theory based on formanilide used, or 99.3% of the theory based on formanilide reacted.

Example 20

From 200 g. silica gel of the type described in Example 19 and 3.3 g. vanadium (IV) oxychloride a catalyst is prepared as described in Example 1, and the catalyst is used for reacting 800 g. formanilide. In addition to 119 g. unreacted formanilide there is obtained 570 g. benzonitrile, i.e., 83.8% of the theory based on formanilide used, or 98.7% of the theory based on formanilide reacted.

In an analogous manner, p-methoxybenzonitrile is obtained from N-formyl-p-anisidine in a 60% yield, based on the initial material.

Example 21

From 200 g. of silica gel of the type described in Example 19 a catalyst is prepared by soaking with a solution of 2.4 g. ammonium tungstate in 100 ml. 2 N ammonia and subsequently heating at 300° C. in a current of nitrogen. The catalyst which contains 1% tungstic oxide in addition to SiO$_2$ is used for reacting 800 g. of formanilide per hour. In addition to 119 g. formanilide, there is obtained 572 g. benzonitrile, i.e., 84.1% of the theory based on formanilide used, or 99% based on formanilide reacted.

Example 22

800 g. per hour of formanilide is reacted as described in Example 1 in the presence of a synthetic aluminum silicate catalyst (15% Al₂O₃; 85% SiO₂; obtained by joint precipitation; 65% of the pores between 10 and 200 A.; mean pore radius 64 A.; internal surface 318 m.²/g.). In addition to 86 g. unreacted formanilide there is obtained 589 g. benzonitrile, i.e., 86.5% of the theory based on formanilide used, and 97.3% of the theory based on formanilide reacted.

*Example 23*

800 g. per hour of formanilide is reacted in an apparatus as described in Example 1 and in an analogous manner. The catalyst used is natural bleaching earth (aluminum silicate with 28% Al₂O₃, 67% SiO₂ and 5% H₂O; activated with acid; internal surface 277 m.²/g.; mean pore radius 84.9 A.; 80% of the pores between 10 and 200 A.; known under the trade name "Terranaerde A") in the form of tablets about 5 mm. in diameter. In addition to 142 g. unreacted formanilide there is obtained 534 g. benzonitrile per hour, i.e., 78.5% of the theory based on formanilide used, or 96.2% of the theory based on formanilide reacted.

*Example 24*

800 g. per hour of formanilide is reacted analogously to Example 1 in the presence of a catalyst prepared by soaking 200 g. natural bleaching earth (acid activated aluminum silicate with 26% Al₂O₃, 68% SiO₂ and 6% H₂O; internal surface 182.4 m.²/g.; mean pore radius 37.0 A.; 85% of the pores between 10 and 200 A., grain size 3 mm.) with a solution of 9.5 g. titanium (IV) chloride in 50 ml. ethanol and treating it with steam at 100° C. The powder is allowed to dry in the air, pressed into tablets about 5 mm. in diameter and heated for 6 hours at 300° C. in a current of ammonia. In addition to 52 g. unreacted formanilide there is obtained 623 g. benzonitrile, i.e., 91.5% of the theory based on formanilide used, or 98% of the theory based on formanilide reacted.

*Example 25*

A catalyst is prepared from 200 g. tablets about 5 mm. in diameter, consisting of bleaching earth as described in Example 23, by soaking with a solution of 2.4 g. ammonium tungstate in 100 ml. 2 N ammonia and subsequent heating at 300° C. in a current of nitrogen. This catalyst is used for reacting 800 g. formanilide per hour. In addition to 93.5 g. formanilide there is obtained 595 g. benzonitrile, i.e., 87.3% of the theory based on formanilide used, or 99% of the theory based on formanilide reacted.

We claim:

1. A process for production of nitriles which comprises passing an N-formylated primary amino compound selected from the group consisting of an N-formylated alkyl primary amine, an N,N'-diformylated alkylene di-primary diamine, an N-formylated cycloalkyl primary amine, an N-formylated aryl hydrocarbon primary amine, an N-formylated aralkyl primary amine and the aforesaid N-formylated primary amines substituted on carbon atoms with 1-2 members from the group consisting of 1-2 halogen atoms, alkoxy of 1-4 carbons and nitrile, said N-formylated primary amine being free from reactive groups other than said N-formylated amine groups, at 400-600° C. in the gas phase in contact with a catalyst selected from the group consisting of silica gel and an inorganic silicate containing up to 40% by weight of a basic oxide selected from the group consisting of magnesium oxide, calcium oxide, iron oxide, aluminum oxide and mixtures thereof, said catalyst having more than 50% of its pores with a radius ranging from 10 to 200 A., a mean pore radius within the range of 20 to 100 A. and an internal surface of less than 550 square meters per gram, and thereby converting the N-formylated primary amino compound into a nitrile.

2. A process as claimed in claim 1 wherein said catalyst contains 0.1-10% by weight of an oxide selected from the group consisting of aluminum oxide, titanium dioxide, zirconium dioxide, thorium dioxide, vanadium oxide, chromium oxide, molybdenum oxide and tungstic oxide.

3. A process as claimed in claim 1 wherein said temperature is in the range of 460-560° C.

4. A process as claimed in claim 1 wherein the N-formylated primary amine is produced from the respective corresponding primary amine and formic acid in a zone at an elevated temperature, immediately preceding the catalyst zone.

5. A process as claimed in claim 1 wherein the N-formylated primary amine is produced from the corresponding primary amine and a formic acid ester of an alkanol with 1-4 carbon atoms in a zone at an elevated temperature, immediately preceding the catalyst zone.

6. A process as claimed in claim 1 wherein the catalyst used is one which has been regenerated by heating it to 400° to 750° C. in a current of oxygen.

7. A process as claimed in claim 6 wherein the regenerated catalyst used has been treated with a dilute acid selected from the group consisting of formic acid, acetic acid, and hydrochloric acid.

8. A process as claimed in claim 1 wherein said catalyst contains 0.1-10% by weight of titanium dioxide.

References Cited by the Examiner

UNITED STATES PATENTS 2,904,579   9/1959   Muench et al. _____ 260—465

FOREIGN PATENTS 482,943   9/1929   Germany.

OTHER REFERENCES

Wintler et al.: Helvetica Chimica Acta, vol. 37, 1934, pages 2370–2376.

CHARLES B. PARKER, *Primary Examiner.*

JOSEPH P. BRUST, *Assistant Examiner.*